United States Patent
Sindhu et al.

(10) Patent No.: US 6,807,594 B1
(45) Date of Patent: Oct. 19, 2004

(54) RANDOMIZED ARBITERS FOR ELIMINATING CONGESTION

(75) Inventors: Pradeep Sindhu, Los Altos Hill, CA (US); Song Zhang, San Jose, CA (US); Anurag P. Gupta, Saratoga, CA (US); Phil Lacroute, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 651 days.

(21) Appl. No.: 09/905,071

(22) Filed: Jul. 16, 2001

(51) Int. Cl.[7] .................. G06F 13/14; H04L 12/56; H04L 12/28
(52) U.S. Cl. .................. 710/240; 370/395.31
(58) Field of Search .................. 710/107–125, 710/36–45, 240–244; 370/351, 395.3–395.42; 709/238–244

(56) References Cited

U.S. PATENT DOCUMENTS

| | | | | |
|---|---|---|---|---|
| 5,267,235 A | * | 11/1993 | Thacker | 370/396 |
| 6,343,066 B2 | * | 1/2002 | Magill et al. | 370/230 |
| 2003/0081548 A1 | * | 5/2003 | Langevin et al. | 370/230 |

* cited by examiner

Primary Examiner—Sumati Lefkowitz
(74) Attorney, Agent, or Firm—Harrity & Snyder LLP (57) ABSTRACT

A system having multiple arbiters is constructed to reduce the chances of arbiters synchronizing with one another. Each arbiter includes a random process that introduces randomness into an arbitration scheme performed by the arbiter. Because of the randomness, the arbiters will not tend to synchronize with one another, even when receiving an identical stream of input values.

30 Claims, 7 Drawing Sheets

RANDOMIZED ARBITERS FOR ELIMINATING CONGESTION

BACKGROUND OF THE INVENTION

A. Field of the Invention

The present invention relates generally to flow control, and more particularly, to data flow control and arbitration.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was added.

To meet the new demands, purpose-built routers were designed. Purpose-built routers are designed and built with components optimized for routing. They not only handled higher line rates and higher network traffic volume, they also added functionality without compromising line rate performance.

A purpose-built router may include a number of input and output ports from which it transmits and receives information packets. A switching fabric may be implemented in the router to carry the packets between the ports. In a high-performance purpose-built router, the switching fabric may transmit a large amount of information. If too much information is simultaneously sent to the switching fabric, or if too much information is destined for a specific destination on the switching fabric, the switching fabric or portions of the switching fabric may become congested.

In an effort to efficiently use the switching fabric and to ensure that any particular destination is not unfairly favored over other destinations, arbiters are used to control the timing of data flowing from a source to various destinations on the switching fabric. Separate arbiters control data at each source. With this architecture, however, a problem can occur when different sources try to send data to the same set of destinations. The different arbiters have a tendency to come into synchronism (also called in-stride) with one another, and may thus send a high concentration of data to a single destination, potentially overwhelming the portions of the switch fabric leading to that destination, and then all move on to the next destination and overwhelm it, and so on.

Synchronization of arbiters is a problem which can occur in any system having multiple arbiters operating in parallel. Therefore, the problem exists in many environments other than routing and networking.

It therefore would be desirable to implement arbiters at various data transmission sources that do not tend to come in-stride with one another, even when different sources attempt to send to the same set of destinations.

SUMMARY OF THE INVENTION

Systems and methods consistent with the invention provide, among other things, arbiters that control the sending of information in a manner such that arbiters do not become in-stride.

One aspect of the present invention is directed to an arbiter. The arbiter comprises a randomization table, a mapping component, an arbiter component, a de-randomization table, and an unmapping component. The randomization table stores randomization values. The mapping component modifies data items based on the randomization values. The arbiter component selects certain ones of the modified versions of the data items based on an arbitration scheme. The de-randomization table stores de-randomization values based on the randomization values stored in the randomization table, and the unmapping component converts the selected modified data items from the arbiter component back to original versions of the data items based on the de-randomization values.

An arbiter consistent with a second aspect of the present invention includes a register, a random generator, and an arbiter. The register stores representations of data items and includes a plurality of bits. Each bit represents information of a data item and is set when the data item is waiting to be transmitted. A random generator generates a random pointer that refers to one of the bits of the register. The arbiter selects data items by checking each of the plurality of bits of the register.

A third aspect of the present invention is directed to a method of arbitrating among multiple data items. The method includes randomizing the data items, selecting certain ones of the data items in accordance with an arbitration scheme based on the randomized the data items, and de-randomizing the selected data items.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, in one implementation, destination information entering an arbiter is re-mapped to a different temporary destination. The re-mapping is based on a random process in each arbiter. The arbiter operates on the re-mapped destinations. The output destination from the arbiter is transformed back to its original destination based on a de-randomization process. Even if identical destination information is transmitted to multiple arbiters, the random re-mapping of the destination information keeps the arbiters from synchronizing.

System Description

Figure 1:
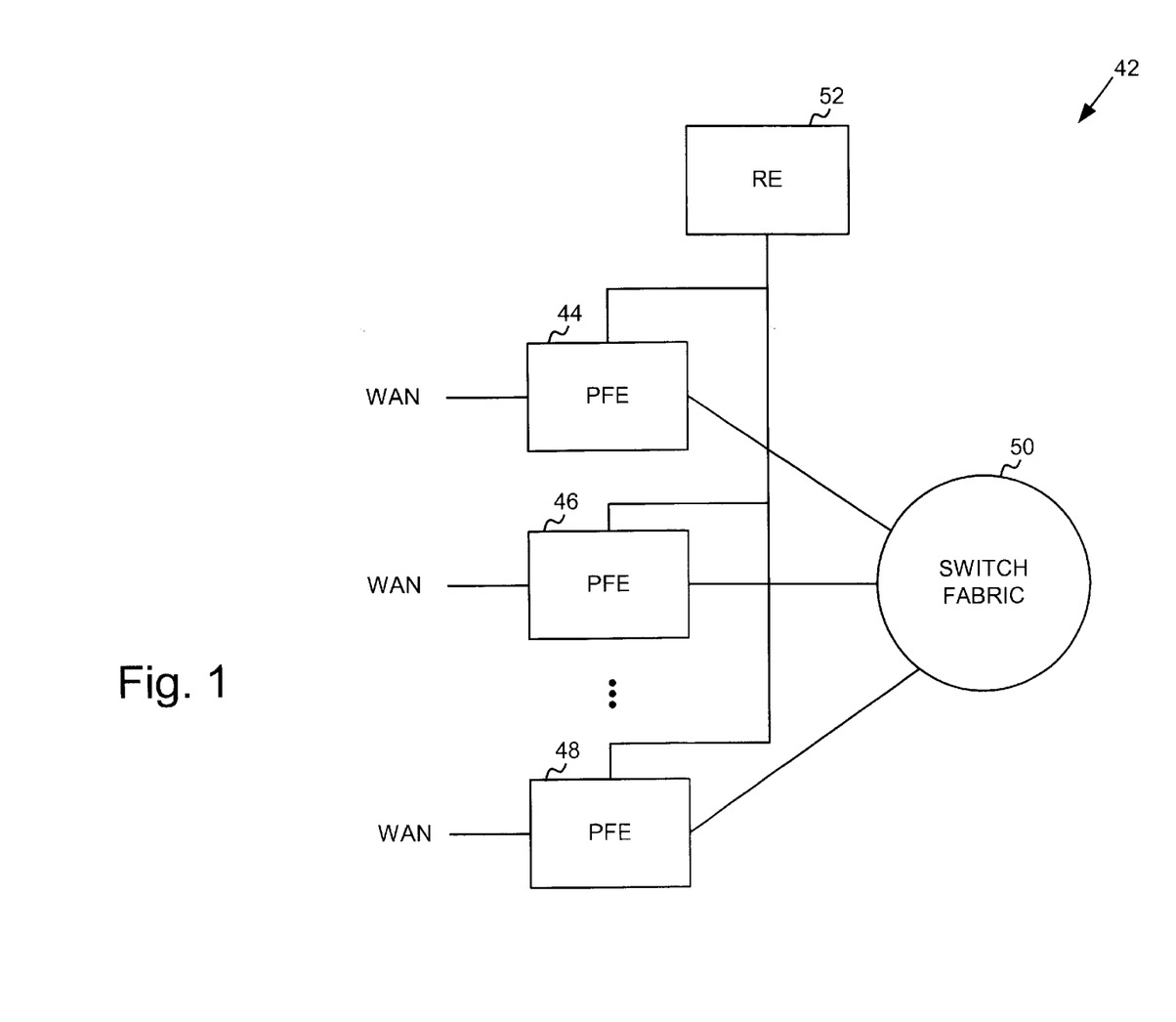
FIG. 1 is a block diagram illustrating an exemplary routing system in which the present invention may be implemented.

FIG. 1 is a block diagram illustrating an exemplary routing system 42 in which the present invention may be implemented. System 42 comprises packet forwarding engines (PFEs) 44, 46 . . . 48, a switch fabric 50, and a routing engine (RE) 52. System 42 receives a data stream from a physical link, processes the data stream to determine destination information, and transmits the data stream out on a link in accordance with the destination information.

RE 52 performs high level management functions for system 42. For example, RE 52 communicates with other networks and systems connected to system 42 to exchange information regarding network topology. RE 52 creates routing tables based on the network topology information and forwards the routing tables to PFEs 44, 46, and 48. The PFEs use the routing tables to perform route lookup for incoming packets. RE 52 also performs other general control and monitoring functions for system 42.

PFEs 44, 46, and 48 are each connected to RE 52 and switch fabric 50. PFEs 44, 46, and 48 receive data on ports connecting physical links connected to a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 44 will be used as an example to discuss the operations performed by PFEs 44, 46, and 48 consistent with the principles of the invention. PFE 44 processes incoming data by stripping off the data link layer. PFE 44 converts header information from the remaining data into a data structure referred to as a notification.

For example, in one embodiment, the data remaining after the data link layer is stripped off is packet data. PFE 44 converts the layer 2 (L2) and layer 3 (L3) packet header information included with the packet data into a notification. PFE 44 stores the notification, some control information regarding the packet, and the packet data in a series of cells. In one embodiment, the notification and the control information are stored in the first two cells.

PFE 44 performs a route lookup using the notification and the routing table from RE 52 to determine destination information. PFE 44 may also further process the notification to perform protocol-specific functions, policing, and accounting, and might even modify the notification to form a new notification.

If the destination indicates that the packet should be sent out on a physical link connected to PFE 44, then PFE 44 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 50, then PFE 44 retrieves the cells for the packet, modifies the first two cells with the new notification and new control information, if any, and sends the cells to the other PFE via switch fabric 50. The receiving PFE uses the notification to form a packet using the packet data from the cells, and sends the packet out on the port associated with the appropriate physical link of the receiving PFE.

In summary, RE 52, PFEs 44, 46, and 48, and switch fabric 50 perform routing based on packet-level processing. PFEs store each packet using cells while performing a route lookup using a notification, which is based on packet header information. A packet might be received on one PFE and go back out to the network on the same PFE, or be sent through switch fabric 50 to be sent out to the network on a different PFE.

Figure 2:
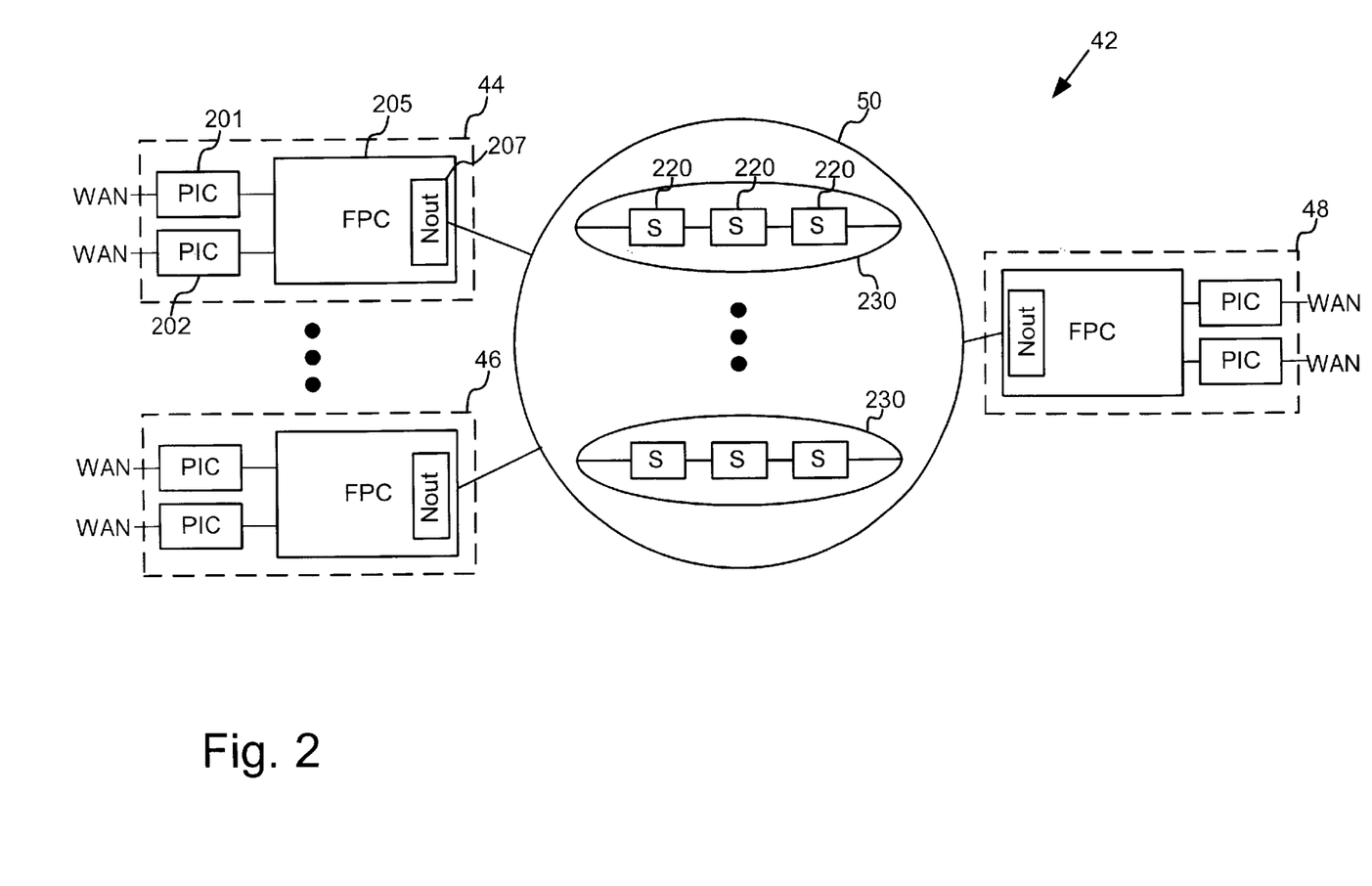
FIG. 2 is a block diagram illustrating portions of the routing system shown in FIG. 1 in additional detail.

FIG. 2 is a block diagram illustrating portions of routing system 42 in additional detail. PFEs 44, 46, and 48 connect to one another through switch fabric 50. Each of the PFEs may include one or more physical interface cards (PICs) 201–202 and flexible port concentrators (FPCs) 205.

PICs 201 transmit data between a WAN physical link and FPC 205. Different PICs are designed to handle different types of WAN physical links. For example, PIC 201 may be an interface for an optical link while PIC 202 may be an interface for an Ethernet link. Although FIG. 2 shows two PICs connected to the FPCs, in other embodiments consistent with the invention there can be a single PIC or more than two PICs connected to an FPC.

Switch fabric 50 includes switches 220 that transmit cells through the fabric 50. The switches may be connected via optical links and may be organized into multiple fabric planes 230. In one embodiment, four fabric planes 230 may be used.

FPCs, such as FPC 205, handle packet transfers to and from PICs 201 and 202, and switch fabric 50. For each packet it handles, FPC 205 performs the previously-discussed route lookup function. FPCs 205 communicate with switch fabric 50 through a fabric communication component 207 (labeled as Nout). Communication component 207 handles the protocols associated with transmitting cells from and receiving cells from switch fabric 50.

Figure 3:
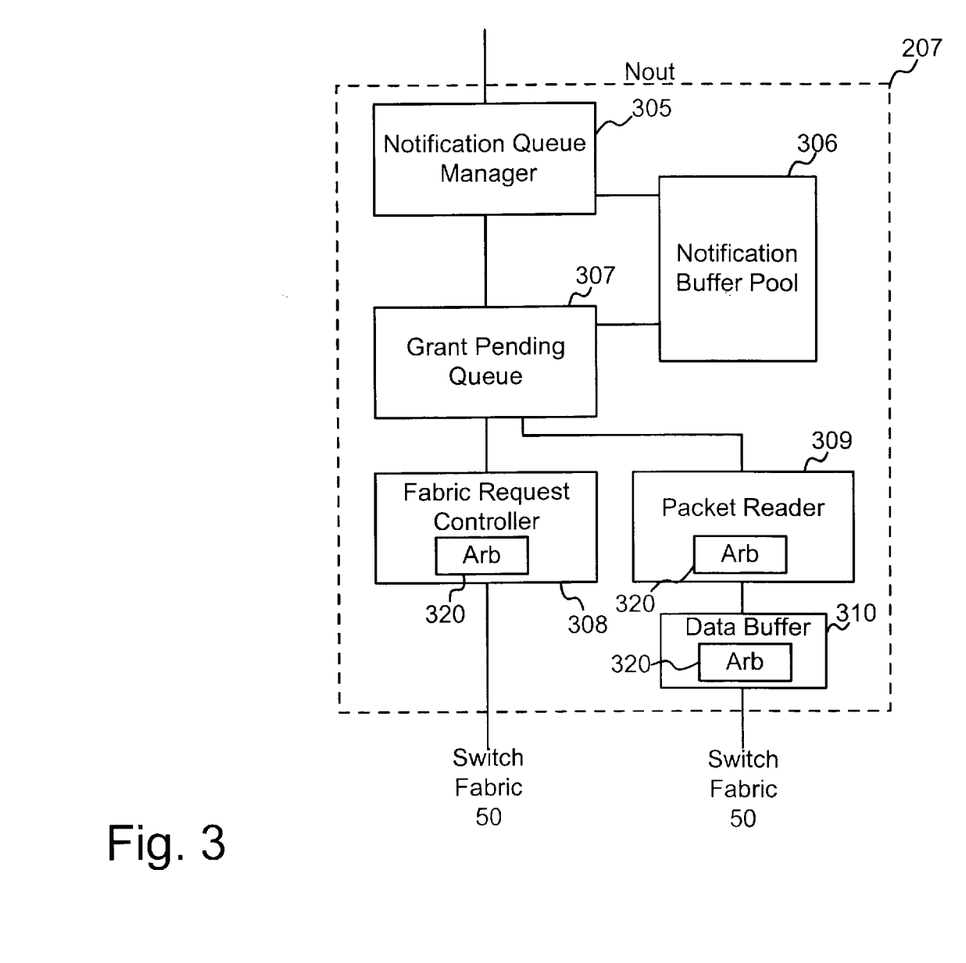
FIG. 3 is a diagram illustrating an implementation of a communication component shown in FIG. 2.

FIG. 3 is a block diagram illustrating an implementation consistent with the present invention of one of communication components 207. Communication component 207 comprises a notification queue manager 305, a notification buffer pool 306, a grant pending queue 307, a fabric request controller 308, a packet reader 309, and a data buffer 310.

Data transmission from communication component 207 begins when notification queue manager 305 receives a notification, signifying that notification and data cells are to be sent to another FPC. Upon receiving the notification, notification queue manager 305 stores the notification in notification buffer pool 306. In response, notification buffer pool 306 returns an address defining where the notification is stored in notification buffer pool 306. Notification queue manager 305 stores the received address in one or more internal queues. Notification queue manager 305 arbitrates across its internal queues to select a notification for processing and sends the address of the notification to grant pending queues 307. Grant pending queue 307 use the address to retrieve the selected notification from buffer pool 306.

Grant pending queue 307 requests permission to send data cells associated with the notification by sending a request signal to fabric request controller 308. More particularly, when grant pending queue 307 receives a selected address from notification queue manager 305, it sends a request that includes the destination and the number of cells in the packet to fabric request controller 308. Grant pending queue 307 holds the outgoing notification until permission to send the packet (called a grant) is received by fabric request controller 308. When permission is granted, grant pending queue sends the notification to packet reader 309, which reads out data cells associated with the notification and forwards the cells to data buffer 310 for transmission over the switch fabric 50.

Fabric request controller 308 transmits requests and packet reader 309 transmits data cells to other destinations, such as other FPCs connected to switch 50, based on arbiters 320. Arbiters 320 may be round-round arbiters (RRAs) that arbitrate sending requests and data cells in a manner that gives equal priority to all destinations.

In a conventional round robin arbiter, requests are distributed with equal priority across all possible destinations. For example, if three sources corresponding to three destinations were under the control of a round robin arbiter, the round robin arbiter may sequentially check whether the first source, the second source, and then the third source have any data to send. After checking the third source, the round robin arbiter starts with the first source. Accordingly, the round robin arbiter gives equal priority to each of three sources. Other types of arbiters may also be used.

The implementation and operation of arbiters consistent with the present invention will now be described in detail with reference to FIGS. 4–7.

Operation and Implementation of Arbiters 320

Figure 4:
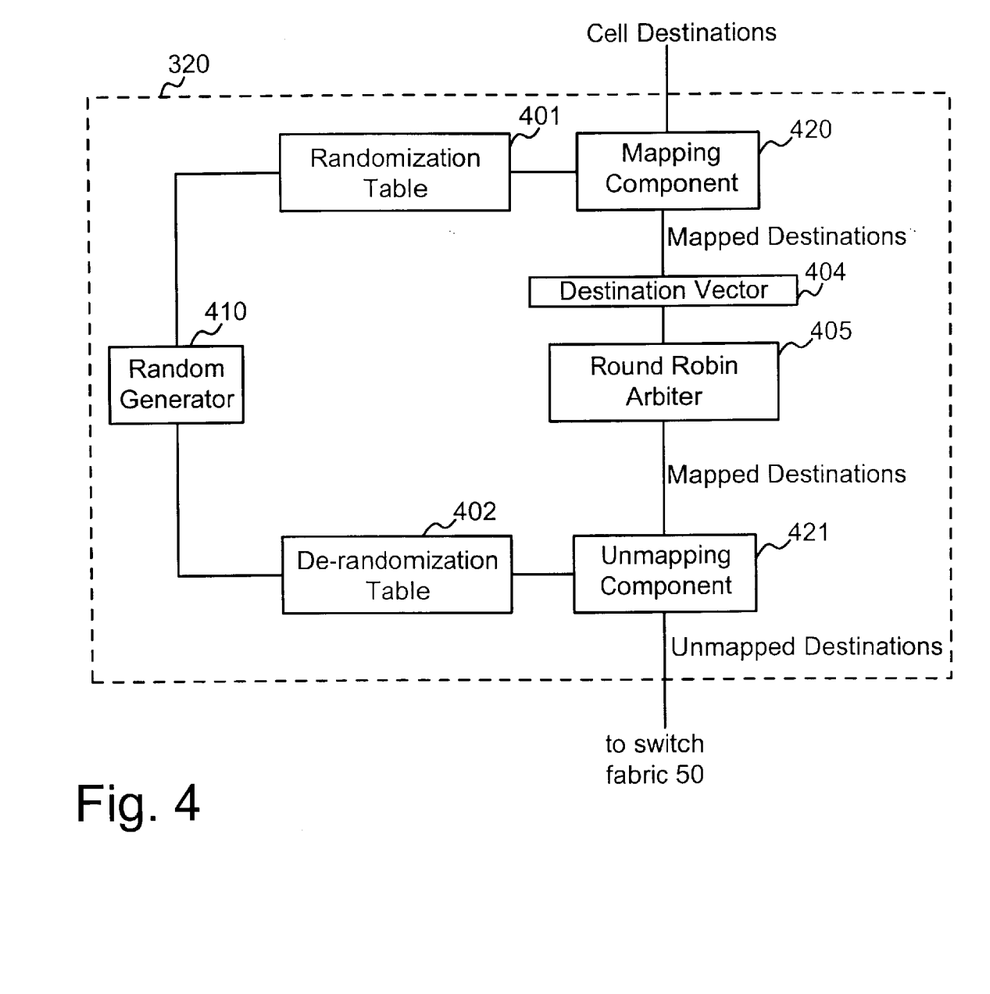
FIG. 4 is a diagram illustrating one of the arbiters shown in FIG. 3 in additional detail.

FIG. 4 is a block diagram illustrating one of arbiters 320. Arbiter 320 includes a randomization table 401 and a corresponding de-randomization table 402. Arbiter 320 also includes a mapping component 420, a destination vector 404, a round robin arbiter 405, and unmapping component 421.

Mapping component 420 uses information in randomization table 401 to generate new "mapped" cell destinations for the cell destinations received by arbiter 320. Similarly, unmapping component 421, based on information in de-randomization table 402, recovers the original cell destinations. A destination vector 404 stores indications of the destinations to which the received cells are to be transmitted. Round robin arbiter 405 implements a conventional round robin arbitration scheme on the destinations stored in destination vector 404 and transmits selected destinations to unmapping component 421.

Arbiter 320 additionally includes a random generator 410, which is used to populate tables 401 and 402. Random generator 410 may be implemented as a dedicated hardware circuit, in software, or a combination of hardware and software.

In one implementation, switch fabric 50 connects 144 destination devices, such as 144 FPCs. Accordingly, the destination vector may be a 144bit register, with each bit corresponding to one of the possible destinations. In this implementation, randomization table 401 and de-randomization table 402 are implemented as a table of 144 rows, with each row storing a value that indexes one of the destinations. Thus, if the destinations are labeled as destinations zero to 143, each row in table 401 may be implemented as an eight bit register that stores a value between zero and 143.

Figure 5:
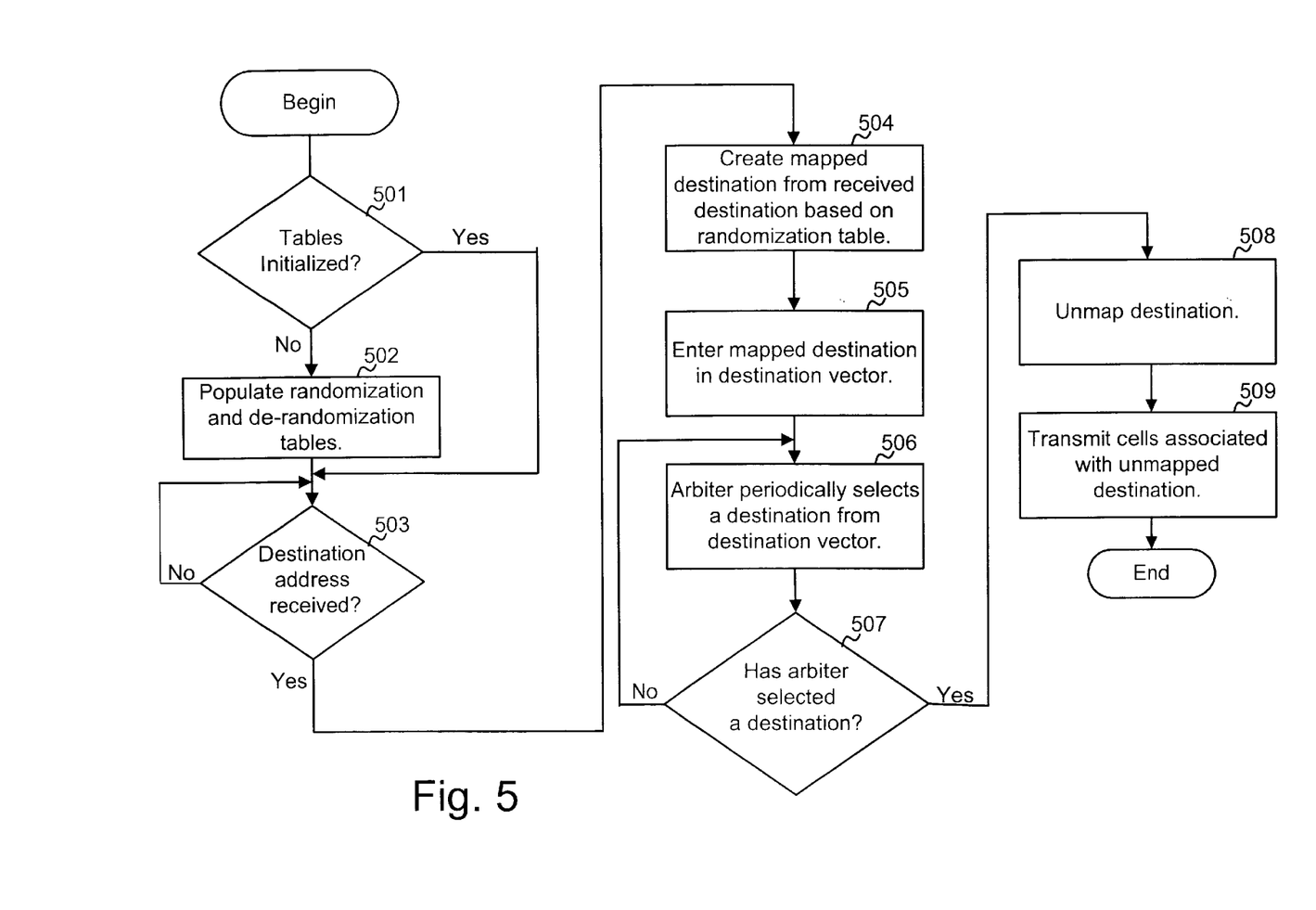
FIG. 5 is a flow chart illustrating operation of the arbiter shown in FIG. 4.

FIG. 5 is a flow chart illustrating operation of the arbiters 320 consistent with an aspect of the present invention. Random generator 410 begins, during an initial power-up or reset operation of routing system 42, by populating randomization table 401 and de-randomization table 402. (Acts 501 and 502). Random generator 410 populates tables 401 and 402 based on a series of random or pseudo-random numbers such that the values in randomization table 401 are essentially a shuffled version of the possible destinations. More specifically, each of the 144 rows of the randomization table 401 contains a random value between zero and 143, where each of the values between zero and 143 is used once and none of the values are repeated.

Figure 6:
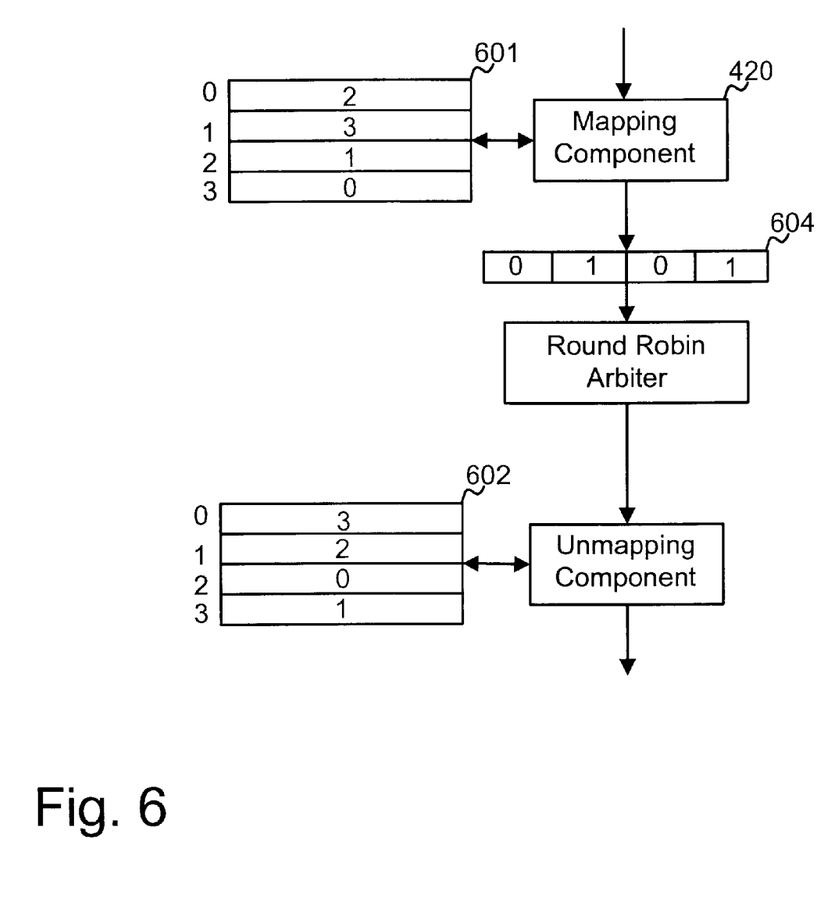
FIG. 6 is diagram of a simplified exemplary embodiment of the arbiter shown in FIG. 4.

For illustration purposes, a simplified version of randomization table 401 and a number of neighboring components are shown in FIG. 6. Randomization table 601 is illustrated as having four rows (labeled as rows zero through three), where each row contains a value between zero and three. As shown, random generator 410 has populated table 601 such that row zero includes the destination value two, row one includes the destination value three, row two includes the destination value one, and row three includes the destination value zero. De-randomization table 602 is filled with values that reverse the mapping dictated by randomization table 601.

Based on the value in the randomization table 601, mapping component 420 maps incoming destinations to new mapped destinations. For example, in FIG. 6, the mapping component 420 would map cells intended for destination zero to destination two.

Returning to FIG. 5, for each received destination address, mapping component 420 changes the received destination to a new mapped destination as described above (Acts 503 and 504). Mapping component 420 next sets a bit in destination vector 404 corresponding to the mapped destinations (Act 505). If, for example, data vector 404 is a 144-bit vector, and an incoming cell destined for destination two was mapped to destination ten, mapping component 420 sets bit ten of destination vector 404 to indicate that cells corresponding to this destination are waiting to be selected by round robin arbiter 405. In the example of FIG. 6, destination vector 604 is a four-bit vector having bits one and three set (corresponding to received destinations two and one, respectively).

Round robin arbiter 405 selects destinations from destination vector 404 (Act 506). After selecting the destination, round robing arbiter 405 clears the bit corresponding to the destination. In one implementation, round robin arbiter 405 is a conventional round robin arbiter that gives equal priority to each destination. In this implementation, round robin arbiter 405 would sequentially check bits zero to 143 of destination vector 404 and then begin checking back at destination zero of destination vector 404.

For each selected destination, unmapping component 421 converts (unmaps) the destination to its original value using de-randomization table 402. (Acts 507 and 508). The cell corresponding to the unmapped destination is then transmitted over switch fabric 50. (Act 509).

In the implementation described above, the functionality of a conventional round robin arbiter is modified using relatively simple circuitry positioned before and after the round robin arbiter. The circuitry randomizes and then de-randomizes values input to the round robin arbiter. Finally, the randomization process for multiple arbiters in the system are independent of one another, so that even if the multiple arbiters receive the same input value, they will not exhibit a tendency to become in-stride with one another.

Figure 7:
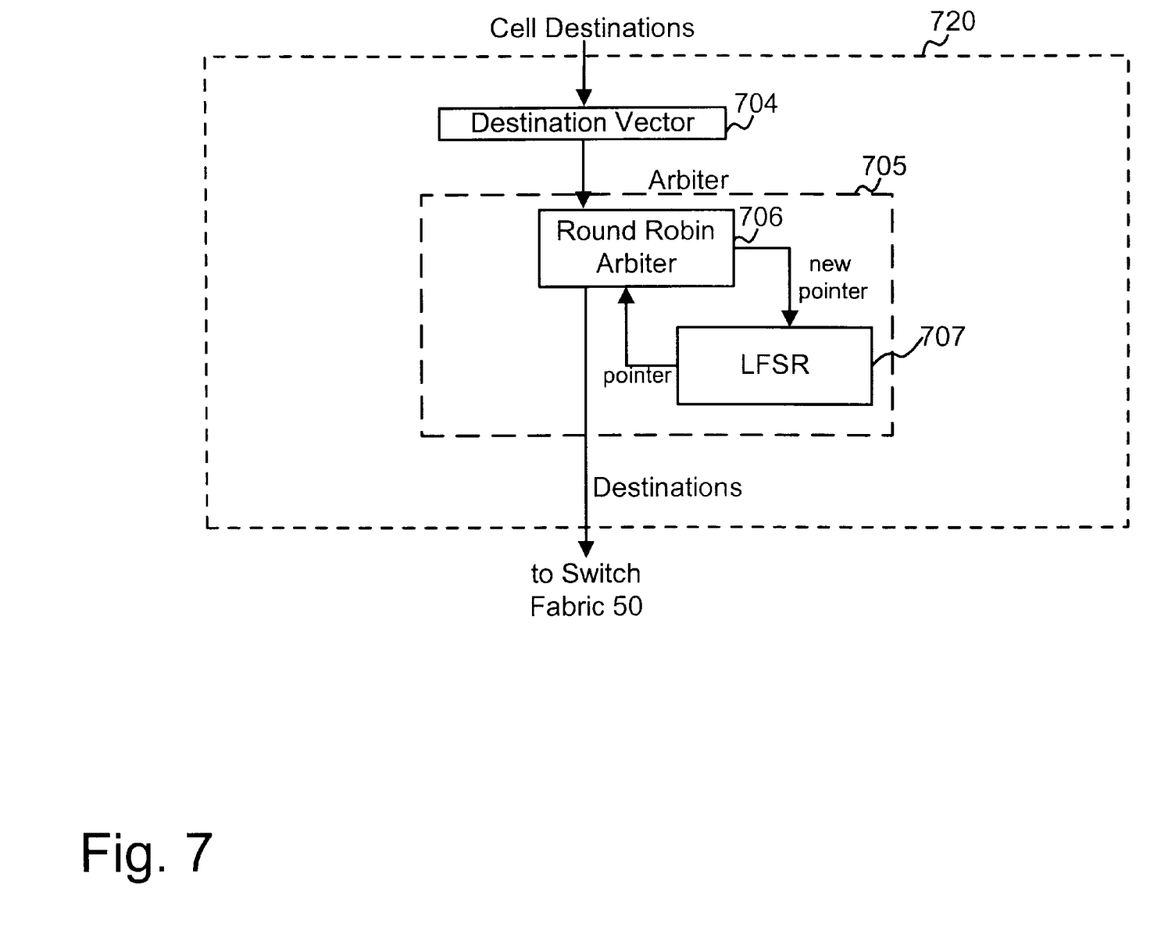
FIG. 7 is a diagram illustrating an arbiter consistent with a second aspect of the present invention.

FIG. 7 is a block diagram of an implementation of an arbiter, labeled as arbiter 720, consistent with a second embodiment of the present invention. As with the arbiter shown in FIG. 4, arbiter 720 includes a destination vector, labeled as destination vector 704. Inputs to the destination vector 704 are not mapped based on a randomization table, but are instead directly set in the destination vector 704 based on the received destination (i.e., a cell intended for the $10^{th}$ destination sets the $10^{th}$ bit in the destination vector 704).

A randomization arbiter 705 is connected to destination vector 704 and arbitrates among the destinations set in destination vector 704. Randomization arbiter 705 is based on a modified round robin arbiter 706 that periodically receives a pointer to a starting destination within destination vector 704 from a random generator, such as linear feedback shift register (LFSR) 707. LFSRs can produce pseudo-random numbers at very high frequencies. Hardware constructions for LFSRs are well known in the art and will not be described further herein. Other circuits for generating random numbers, in addition to LFSRs, may alternatively be used.

In operation, round robin arbiter 706 receives a pointer value from LFSR 707 that indicates at which destination address in destination vector 704 the round robin arbiter should begin. If, for example, the pointer value is ten, round robin arbiter 705 begins by checking the $10^{th}$ bit in destination vector 704. The round robin arbiter will then sequentially check the bits in the destination vector 704 up through the $143^{rd}$ bit, and then wrap around to bit zero and sequentially check the bits in destination vector 704 up through bit nine. After bit nine, round robin arbiter 706 gets a new pointer value from LFSR 707, and beginning at the new value, checks each of the bits in destination vector 704. The new pointer value generated by LFSR 707 may be generated periodically or in response to a new pointer request signal from round robin arbiter 706.

Arbiter 720 provides similar functionality as the arbiter shown in FIG. 4, due to the fact that both arbiters introduce an element of randomness into their selections. More particularly, multiple randomization arbiters 720 in a system receive different LSFR initial seed values, and will thus not have a tendency to become in-stride with one another.

Although described in the context of a purpose-built router, concepts consistent with the present invention can be implemented in any system that uses multiple arbiters where it is desirable to keep two or more of the arbiters from becoming in-stride with one another. Although the arbiters described herein arbitrate across destinations, an arbiter consistent with the principles of the invention may be used in any system requiring arbitration. For example, data items other than destinations may be randomized.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. An arbiter comprising:
   a randomization table storing randomization values;
   a mapping component coupled to the randomization table, the mapping component modifying data items based on the randomization values;
   an arbiter component configured to select certain ones of the modified data items based on an arbitration scheme;
   a de-randomization table storing de-randomization values based on the randomization values stored in the randomization table; and
   an unmapping component coupled to the arbiter component and configured to convert the selected modified data items from the arbiter component back to original data items based on the de-randomization values.

2. The arbiter of claim 1, wherein the data items are destinations in a network router.

3. The arbiter of claim 1, further comprising:
   a random generator coupled to the randomization table and the de-randomization table, the random generator generating and storing the randomization values in the randomization table and the de-randomization values in the de-randomization table.

4. The arbiter of claim 1, further comprising:
   a data item vector register coupled to the mapping component and the arbiter component, the data item vector register including a plurality of bits, each bit representing a data item.

5. The arbiter of claim 1, wherein the arbitration scheme is a round robin arbitration scheme.

6. An arbiter comprising:
   a register including a plurality of bits, each bit representing a data item, and each bit being set when information associated with the data item is waiting to be transmitted;
   a random generator configured to generate a random pointer that relates to one of the bits of the register; and
   an arbiter configured to select data items by checking the plurality of bits of the register including the bit pointed to by the random generator.

7. The arbiter of claim 6, wherein the random generator generates a new random pointer for the arbiter after the round robin arbiter completes a cycle of checking the bits of the register.

8. The arbiter of claim 7, wherein the random generator is a linear feedback shift register.

9. The arbiter of claim 6, wherein the arbiter, after checking one of the bits in the register, clears the bit.

10. A method of arbitrating among multiple data items comprising:
    randomizing the multiple data items;
    selecting certain ones of the data items in accordance with an arbitration scheme based on the randomized data items; and
    de-randomizing the selected data items.

11. The method of claim 10, wherein the arbitration scheme is a round robin arbitration scheme.

12. The method of claim 10, wherein the data items are destination addresses.

13. The method of claim 12, further comprising:
    transmitting information to destinations based on the selected data items.

14. The method of claim 10, further comprising:
    randomizing the data items by looking up a randomized value in a randomization table.

15. The method of claim 10, further comprising:
    de-randomizing the selected data items by looking up an original value associated with the data item in a de-randomization table.

16. A system comprising:
    a first arbiter receiving a first set of N inputs, where N is an integer, the first arbiter selecting ones of the first set of inputs based on an arbitration scheme that includes an element of randomness when selecting the ones of the first set of inputs; and
    a second arbiter receiving a second set of N inputs, the second arbiter selecting ones of the second set of inputs based on an arbitration scheme that includes an element of randomness when selecting the ones of the second set of inputs, the elements of randomness in the first and second arbiters preventing the first and second arbiters from synchronizing with one another.

17. The system of claim 16, wherein the first and second sets of N inputs are destinations associated with information to be transmitted over a network.

18. The system of claim 17, wherein the network is a fabric switch of a router.

19. The system of claim 16, wherein the arbitration scheme is a round robin arbitration scheme.

20. The system of claim 16, wherein each of the first and second arbiters further comprise:

a randomization table for storing randomization values that introduce the randomness into the arbitration scheme when selecting the ones of the first and second set of inputs; and a mapping component for converting information in the received first and second set of inputs to a randomized version of the information based on the randomization values stored in the randomization table.

21. The system of claim 20, wherein each of the first and second arbiters further comprise:

a random generator coupled to the randomization table and configured to generate the randomization values stored in the randomization table.

22. The system of claim 20, wherein each of the first and second arbiters further comprise:

a de-randomization table for storing de-randomization values for removing the randomness introduced by the randomization values and the mapping component; and an unmapping component configured to convert the randomized version of the information back to an original version of the information based on the de-randomization values.

23. The system of claim 16, wherein each of the first and second arbiters further comprise:

a register for storing destinations of the received N inputs, the register including a plurality of bits, each bit representing a possible destination for the N inputs, and each bit being set when an input associated with the destination is waiting to be transmitted to the network;

a random generator configured to generate a random pointer that relates to one of the bits of the register; and a round robin arbiter configured to select an input by sequentially checking each of the plurality of bits of the register, the round robin arbiter, after completing the checking of each of the plurality of bits of the register, repeating the sequentially checking each of the plurality of bits of the register beginning at an initial location determined by the random pointer.

24. A network device comprising:

means for randomizing information associated with an input stream of data items;

means for arbitrating among the randomized information to select certain ones of the data items; and means for de-randomizing the selected information.

25. The network device of claim 24, further comprising:

a randomization table for storing randomization values that indicate how information associated with the data items is to be modified; and mapping means for modifying the information based on the values stored in the randomization table.

26. The network device of claim 25, further comprising:

a de-randomization table for storing de-randomization values based on the randomization values stored in the randomization table; and unmapping means for converting the selected modified information from the mapping means back to original versions of the data items based on the de-randomization values.

27. A method comprising:

selecting ones of a first set of N inputs, where N is an integer, based on an arbitration scheme that includes an element of randomness when selecting the ones of the first set of inputs; and selecting ones of a second set of N inputs, where N is an integer, based on an arbitration scheme that includes an element of randomness when selecting the ones of the second set of inputs, the elements of randomness in the first and second selections preventing the first and second selections from synchronizing with one another.

28. The method of claim 27, wherein the first and second sets of N inputs are destinations associated with information to be transmitted over a network.

29. The method of claim 28, wherein the network is a fabric switch of a router.

30. The method of claim 27, wherein the arbitration scheme is a round robin arbitration scheme.

* * * * *